United States Patent
Budge

(10) Patent No.: US 11,633,911 B2
(45) Date of Patent: Apr. 25, 2023

(54) 3D PRINTING METHOD AND APPARATUS

(71) Applicant: Aurora Labs Limited, Applecross (AU)

(72) Inventor: David Budge, Applecross (AU)

(73) Assignee: Aurora Labs Limited, Bibra Lake (AU)

( * ) Notice: Subject to any disclaimer, the term of this patent is extended or adjusted under 35 U.S.C. 154(b) by 530 days.

(21) Appl. No.: 15/738,646

(22) PCT Filed: Jun. 13, 2016

(86) PCT No.: PCT/AU2016/000198
§ 371 (c)(1),
(2) Date: Dec. 21, 2017

(87) PCT Pub. No.: WO2016/205855
PCT Pub. Date: Dec. 29, 2016

(65) Prior Publication Data
US 2018/0162046 A1    Jun. 14, 2018

(30) Foreign Application Priority Data

Jun. 23, 2015 (AU) ................................ 2015902421
Dec. 23, 2015 (AU) ................................ 2015905353

(51) Int. Cl.
*B29C 64/153*   (2017.01)
*B33Y 10/00*    (2015.01)
(Continued)

(52) U.S. Cl.
CPC .......... *B29C 64/153* (2017.08); *B29C 64/205* (2017.08); *B29C 64/268* (2017.08);
(Continued)

(58) Field of Classification Search
CPC ... B29C 64/153; B29C 64/205; B29C 64/268; B29C 64/393; B29C 64/209;
(Continued)

(56) References Cited

U.S. PATENT DOCUMENTS 5,160,822 A    11/1992  Aleshin
5,555,481 A *   9/1996  Rock ....................... B22F 3/008
                                                   419/30
(Continued)

FOREIGN PATENT DOCUMENTS

WO    1997/09141     3/1997
WO    2005/089090    9/2005
(Continued)

OTHER PUBLICATIONS

International Search Report, PCT/AU2016/000198, dated Aug. 18, 2016.
(Continued)

*Primary Examiner* — S. Behrooz Ghorishi
(74) *Attorney, Agent, or Firm* — Andrus Intellectual Property Law, LLP

(57) ABSTRACT

A printing apparatus is for printing a three-dimensional object. The apparatus includes an operative surface, an energy source for emitting at least one energy beam onto the operative surface and a powder dispensing mechanism for depositing powder onto the operative surface, the powder being adapted to be melted by the or each energy beam. The powder dispensing mechanism is configured to deposit multiple layers of powder onto the operative surface simultaneously.

18 Claims, 12 Drawing Sheets

(51) Int. Cl.

| | | |
|---|---|---|
| *B33Y 30/00* | (2015.01) | |
| *B29C 64/205* | (2017.01) | |
| *B29C 64/329* | (2017.01) | |
| *B29C 64/393* | (2017.01) | |
| *B29C 64/268* | (2017.01) | |
| *G02B 27/10* | (2006.01) | |
| *B29C 64/209* | (2017.01) | |
| *B22F 12/00* | (2021.01) | |
| *B22F 10/10* | (2021.01) | |
| *B33Y 50/02* | (2015.01) | |

(52) U.S. Cl.
CPC .......... *B29C 64/329* (2017.08); *B29C 64/393* (2017.08); *B33Y 10/00* (2014.12); *B33Y 30/00* (2014.12); *G02B 27/1073* (2013.01); *B22F 10/10* (2021.01); *B22F 12/00* (2021.01); *B29C 64/209* (2017.08); *B33Y 50/02* (2014.12); *Y02P 10/25* (2015.11)

(58) Field of Classification Search
CPC ... B29C 64/329; G02B 27/1073; B33Y 30/00; B33Y 10/00; B33Y 50/02; B22F 2003/1056; B22F 3/1055; Y02P 10/295
See application file for complete search history.

(56) References Cited

U.S. PATENT DOCUMENTS

| | | | |
|---|---|---|---|
| 5,837,960 | A | 11/1998 | Lewis et al. |
| 6,376,148 | B1 | 4/2002 | Liu |
| 6,780,368 | B2 | 8/2004 | Liu |
| 6,811,744 | B2 | 11/2004 | Keicher et al. |
| 7,537,722 | B2 | 5/2009 | Andersson |
| 9,044,841 | B2 | 6/2015 | Tian |
| 9,352,420 | B2 | 5/2016 | Whitfield |
| 9,573,225 | B2 | 2/2017 | Buller |
| 10,093,065 | B2 | 10/2018 | Ederer et al. |
| 2002/0106054 | A1 | 8/2002 | Caflisch |
| 2003/0074096 | A1 | 4/2003 | Das et al. |
| 2003/0206820 | A1 | 11/2003 | Keicher et al. |
| 2009/0206065 | A1* | 8/2009 | Kruth .................... B29C 64/393 219/121.66 |
| 2013/0108726 | A1* | 5/2013 | Uckelmann ............ B33Y 10/00 425/174.4 |
| 2013/0264750 | A1 | 10/2013 | Hofacker et al. |
| 2013/0280547 | A1 | 10/2013 | Brandl et al. |
| 2013/0319325 | A1 | 12/2013 | Whitfield |
| 2014/0106088 | A1 | 4/2014 | Bilaine |
| 2015/0029259 | A1 | 1/2015 | Humet et al. |
| 2015/0082925 | A1 | 1/2015 | Humet et al. |
| 2015/0174658 | A1 | 6/2015 | Ljungblad |
| 2015/0290710 | A1 | 10/2015 | Ackelid |
| 2015/0306666 | A1 | 10/2015 | Honda |
| 2015/0314528 | A1 | 11/2015 | Gordon |
| 2015/0367415 | A1 | 12/2015 | Buller |
| 2016/0052014 | A1 | 2/2016 | Halder et al. |
| 2016/0067928 | A1 | 3/2016 | Mark et al. |
| 2016/0107380 | A1 | 4/2016 | Smoot |
| 2017/0021455 | A1* | 1/2017 | Dallarosa ............. B23K 26/073 |
| 2017/0072466 | A1 | 3/2017 | Zehavi et al. |
| 2017/0129052 | A1 | 5/2017 | Buller |
| 2017/0182556 | A1 | 6/2017 | Ramaswamy |
| 2017/0326681 | A1* | 11/2017 | Sidhu ..................... C22F 1/183 |

FOREIGN PATENT DOCUMENTS

| | | |
|---|---|---|
| WO | 2008/147306 | 12/2008 |
| WO | 2015/001241 | 1/2015 |
| WO | 2015/040433 | 3/2015 |
| WO | 2015/094720 | 6/2015 |
| WO | 2016009426 | 1/2016 |
| WO | 2016044876 | 3/2016 |

OTHER PUBLICATIONS

Written Opinion, PCT/AU2016/000198, dated Aug. 18, 2016.
International Preliminary Report on Patentability, PCT/AU2016/000198, dated Apr. 5, 2017.

* cited by examiner

3D PRINTING METHOD AND APPARATUS

CROSS-REFERENCE TO RELATED APPLICATIONS

This application is the U.S. national stage application of International Application PCT/AU2016/000198, filed Jun. 13, 2016, which international application was published on Dec. 29, 2016, as International Publication WO 2016/205855 in the English language. The International Application claims priority of Australian Patent Application No. 2015902421, filed Jun. 23, 2015 and Australian Patent Application No. 2015905353, filed Dec. 23, 2015. The international application and Australian applications are all incorporated herein by reference, in entirety.

FIELD OF INVENTION

The present invention relates to a 3D printing method and apparatus.

More particularly, the present invention relates to a 3D printing method and apparatus adapted for manufacturing objects at high speed.

BACKGROUND ART

Three-dimensional (3D) printed parts result in a physical object being fabricated from a 3D digital image by laying down consecutive thin layers of material.

Typically these 3D printed parts can be made by a variety of means, such as selective laser melting or sintering, which operate by having a powder bed onto which an energy beam is projected to melt the top layer of the powder bed so that it welds onto a substrate or a substratum. This melting process is repeated to add additional layers to the substratum to incrementally build up the part until completely fabricated.

These printing methods are significantly time consuming to perform and it may take several days, or weeks, to fabricate a reasonable sized object. The problem is compounded for complex objects comprising intricate component parts. This substantially reduces the utility of 3D printers and is one of the key barriers currently impeding large-scale adoption of 3D printing by consumers and in industry.

Power is also a significant limiting factor for existing printing methods.

Whilst selective electron beam melting can be used as a powerful material fabrication method, this must typically be performed in a vacuum because interaction between charged particle beams and air molecules at atmospheric pressure causes dispersion and attenuation of the beams, significantly impairing their power. It is, therefore, known to use an assembly comprising a high-powered electron gun (for example, a 150 kW electron gun) contained inside a first vacuum housing that is adjoined to a second vacuum housing containing a workpiece to be operated on. Such assemblies, however, result in low productivity rates due to the required pumping time for evacuating the housings. The practical size of the workpiece that may be contained inside the second housing is also substantially limited.

It is, therefore, also known to use a plasma window in conjunction with a high-powered electron gun to perform material fabrication work. Such an assembly comprises an electron gun contained in a vacuum chamber, wherein the vacuum chamber is adjoined to a region of higher pressure (such as atmospheric pressure) containing a workpiece. A beam of charged particles is discharged from within the vacuum chamber and out of the chamber via a beam exit disposed in a wall of the chamber.

A plasma interface is disposed at the beam exit comprising an elongate channel for bonding a plasma. A plasma-forming gas, such as helium, argon or nitrogen, that is highly ionized, is injected into the channel. Electrical currents are applied to a cathode and an anode disposed at opposite ends of the channel which causes a plasma to form and bond statically between the cathode and anode. The plasma serves to prevent pressure communication between the higher pressure region and the vacuum chamber whilst permitting substantially unhindered propagation of charged particles from the vacuum chamber to the higher pressure region, via the channel, and onto the workpiece.

Whilst plasma interfaces constructed in the above manner also serve to pump down the vacuum chamber, this pumping action is weak and of limited effectiveness only. In practice, both the vacuum chamber and the plasma interface's channel must be pumped such that they are substantially in vacuum prior to the formation of the plasma. This is time consuming and, to implement effectivity, requires equipment that is costly and mechanically cumbersome. Particle gun assemblies that comprise plasma interfaces constructed in this manner are, therefore, not well suited for 3D printing apparatuses, where the gun assembly is required to be dexterous and flexible in operation.

OBJECT OF THE INVENTION

It is an object of the present invention to provide a method and apparatus for printing 3D objects at high speed.

SUMMARY OF THE INVENTION

In accordance with one aspect of the present invention, there is provided a printing apparatus for printing a three-dimensional object, comprising:
an operative surface;
an energy source for emitting at least one energy beam onto the operative surface;
a powder dispensing mechanism for depositing powder onto the operative surface,
the powder being adapted to be melted by the or each energy beam,
wherein the powder dispensing mechanism is configured to deposit multiple layers of powder onto the operative surface simultaneously.

The powder dispensing mechanism may comprise a plurality of powder-dispensing supply hoppers and a supply control mechanism, the supply hoppers and control mechanism being configured to dispense powder from each of the supply hoppers onto the operative surface to form the multiple layers of powder simultaneously.

The supply hoppers and control mechanism may be configured to deposit the multiple layers of powder onto the operative surface in a staggered manner such that, when the layers are being worked on by the energy beam, each layer of powder has a topmost surface that is, at least in part, not covered by an overlying layer of powder.

The energy source may, in use, emit energy beams onto two or more layers of powder simultaneously.

The energy source may, in use, emit an energy beam onto individual layers of powder in a sequence.

The printing apparatus may comprise an energy beam splitting means for splitting and directing an energy beam into two or more separate energy beams.

The supply hoppers and control mechanism may be configured to deposit the multiple layers of powder onto the operative surface in a curved path.

In accordance with one further aspect of the present invention, there is provided a method for printing a three-dimensional object, the method comprising the steps of:
  depositing a plurality of layers of powder simultaneously onto an operative surface;
  using an energy source to emit at least one energy beam onto at least one layer of powder formed on the operative surface to melt the powder and form part of the three-dimensional object; and
  repeating the steps above until the three-dimensional object is completely formed.

The layers of powder in the method may be deposited onto the operative surface in a staggered manner such that, when the layers of powder are being worked on by the or each energy beam, each layer of powder deposited has a topmost surface that is, at least in part, not covered by an overlying layer of powder.

The or each energy beam in the method may be emitted onto two or more layers of powder simultaneously.

The or each energy beam in the method may be emitted onto individual layers of powder in a sequence.

An energy beam in the method may be split and directed into two or more separate energy beams using an energy beam splitting means.

In accordance with one further aspect of the present invention, there is provided a printing apparatus for printing a three-dimensional object, comprising:
  an operative surface;
  at least one supply hopper and a control mechanism for depositing multiple layers of powder onto the operative surface simultaneously; and
  an energy source for emitting at least one energy beam onto at least one layer of powder formed on the operative surface,
wherein the or each supply hopper and the control mechanism are adapted to dispense powder onto a heap on the operative surface in a manner such that a plurality of cascading layers of powder form and flow simultaneously over an external surface of the heap, each layer of powder having an exposed surface that is, at least in part, not covered by an adjacent layer of powder when the layer is being formed.

Particles comprised in the powder may each have one or more physical properties that cause formation of the cascading layers of powder on the heap.

The energy source may emit energy beams onto two or more layers of powder on the heap simultaneously.

The energy source may emit an energy beam onto individual layers of powder on the heap in a sequence.

The apparatus may comprise a scanning means for determining a position, velocity and/or size of one or more particles comprised in the powder when the, or each, particle is travelling from the supply hopper onto the heap.

The scanning means may be adapted to measure an airborne density of the powder travelling to the heap.

The scanning means may be adapted to measure a volume of powder deposited on the heap.

The scanning means may be adapted to measure a shape or profile of the heap.

The scanning means may be adapted to measure a shape, form, relative position or one or more surface characteristics of the layers of powder formed on the external surface of the heap.

In accordance with one further aspect of the present invention, there is provided a method for printing a three-dimensional object comprising the steps of:
  depositing powder onto a heap disposed on an operative surface such that a plurality of cascading layers of powder are formed on and simultaneously flow over an external surface of the heap; and
  using an energy source to emit at least one energy beam onto at least one layer of powder.

In accordance with one further aspect of the present invention, there is provided a charged particle propagation apparatus comprising a:
  generator comprising a vacuum chamber with a gun therein for discharging a charged particle beam from within the vacuum chamber and out of the vacuum chamber through a beam exit disposed in a wall of the vacuum chamber;
  higher pressure region adjoining the vacuum chamber at the beam exit that is maintainable at a pressure greater than a pressure of the vacuum chamber;
  plasma interface disposed at the beam exit comprising a plasma channel, wherein the plasma channel:
    is aligned with the beam exit;
    has a first end and a second end; and
    has at least three electrode plates disposed between the first end and the second end,
  and wherein:
    a sequence of electrical currents are applied to the electrode plates causing at least one plasma to move from the first end to the second end of the plasma channel, thereby pumping down the beam exit; and
    the charged particle beam is propagated from the vacuum chamber through the, or each, plasma in the plasma channel and into the higher pressure region.

The sequence may cause a plurality of plasmas to move concurrently from the first end to the second end of the plasma channel.

A non-plasma region may be formed between two successive plasmas moving concurrently from the first end to the second end of the plasma channel.

The, or each, non-plasma region may contain residual gas from the vacuum chamber.

The sequence may be a repeating sequence causing the beam exit to be pumped down continuously.

In accordance with one further aspect of the present invention, there is provided a pumping method for pumping down a vacuum chamber comprising the steps of:
  disposing a plasma interface at an exit of the vacuum chamber comprising a plasma channel, wherein the plasma channel:
    is aligned with the beam exit;
    has a first end and a second end; and
    has at least three electrode plates disposed between the first end and the second end,
  and applying a sequence of electrical currents to the electrode plates causing at least one plasma to move from the first end to the second end of the plasma channel.

The pumping method may comprise the additional steps of applying a further sequence of electrical currents to the electrode plates causing a plurality of plasmas to move concurrently from the first end to the second end of the plasma channel.

The sequence of electrical currents used in the pumping method may cause a non-plasma region to be formed between two successive plasmas moving concurrently from the first end to the second end of the plasma channel.

Residual gas from the vacuum chamber may be contained in the, or each, non-plasma region formed when the pumping method is executed.

The sequence of electrical currents used in the pumping method may be repeated causing the beam exit to be pumped down continuously.

The energy source used in the printing apparatus may comprise a charged particle propagation apparatus as herein disclosed.

The energy source used in the method for printing a three-dimensional object may comprise a charged particle propagation apparatus as herein disclosed.

BRIEF DESCRIPTION OF DRAWINGS

The present invention will now be described, by way of example, with reference to the accompanying drawings, in which.

DETAILED DESCRIPTION OF THE DRAWINGS

Figure 1:
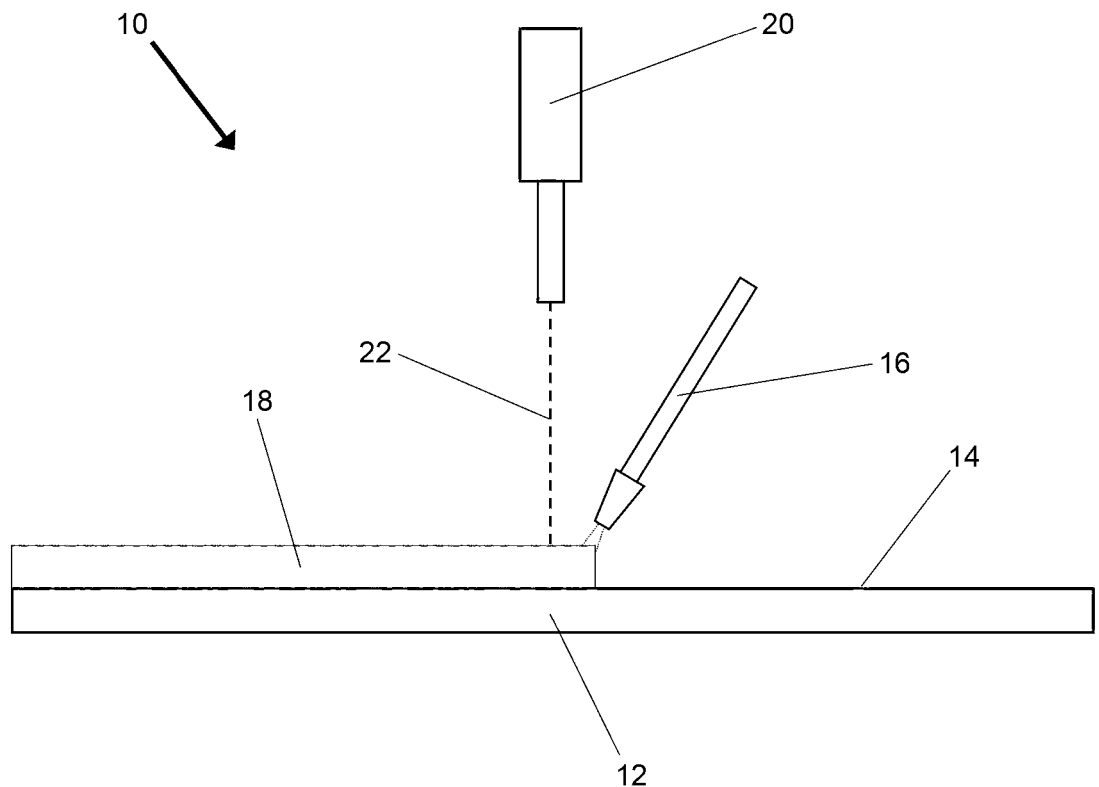
FIG. 1 is a schematic representation of a conventional 3D printing apparatus known in the art.

Referring to FIG. 1, there is shown a schematic representation of a conventional 3D printing apparatus 10 known in the art. The apparatus 10 comprises a substrate 12 with an operative surface 14 on which a printed object is to be fabricated by 3D printing.

The apparatus 10 further comprises a supply hopper 16 that is adapted to deposit a single layer of powder 18 onto the operative surface 14.

An energy source 20 (commonly a laser or electron gun) emits an energy beam 22 onto the layer of powder 18 causing it to melt or sinter selectively to form an individual layer of the 3D object. The process is repeated to add additional layers and incrementally build up the object until it is completed.

Figure 2:
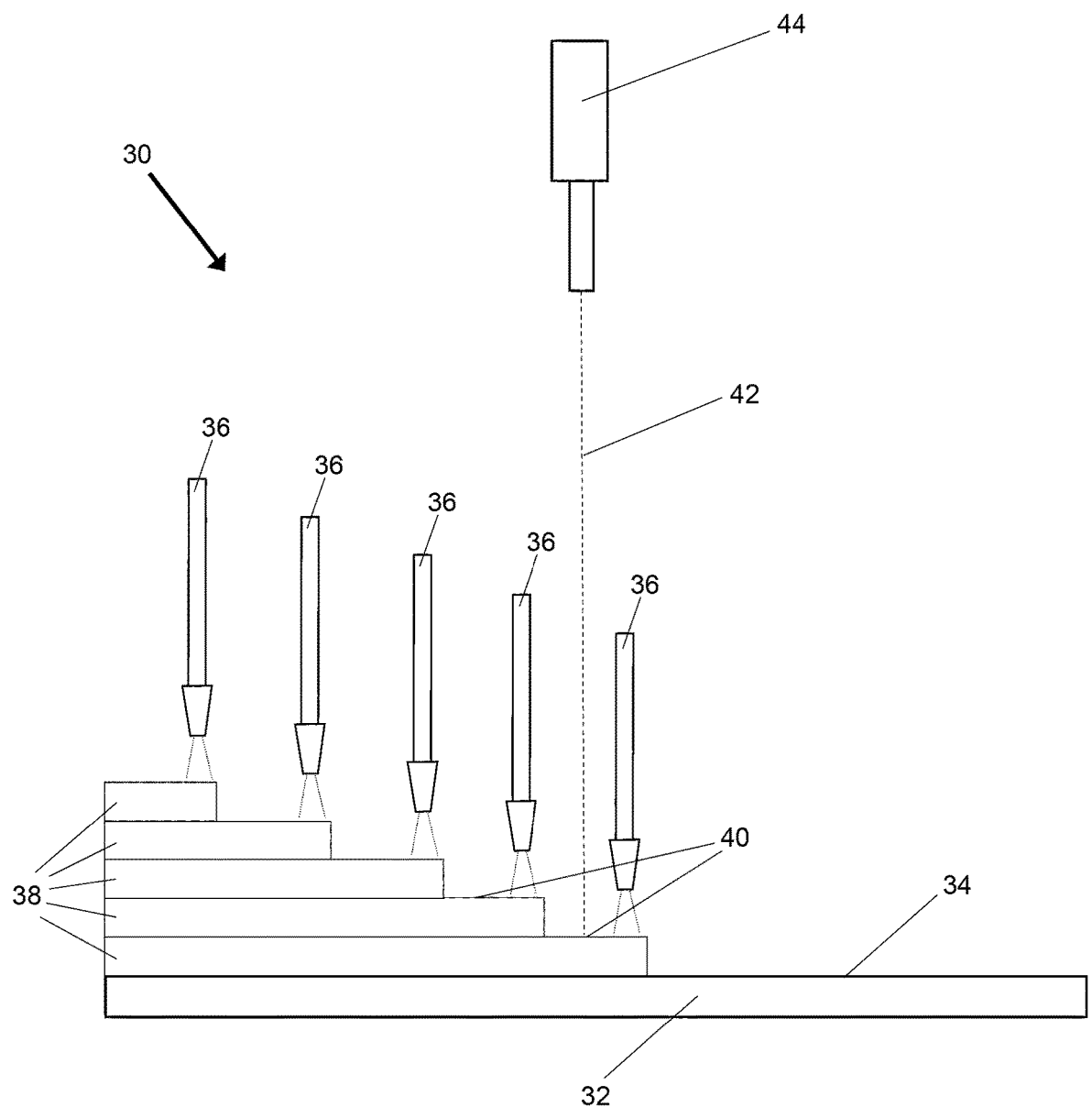
FIG. 2 is a schematic representation of a 3D printing apparatus according to an embodiment of the invention.

Referring to FIG. 2, there is shown a schematic representation of a 3D printing method and apparatus 30 according to a first embodiment of the present invention. The apparatus 30 comprises a substrate 32 having an operative surface 34 on which a printed object is to be fabricated by 3D printing.

The apparatus 30 further comprises a powder dispensing mechanism that is configured to deposit multiple layers of powder onto the operative surface 34 simultaneously. In FIG. 2, the powder dispensing mechanism is depicted in the form of a plurality of supply hoppers 36. The supply hoppers 36, operating in conjunction with a control mechanism (not shown), are configured to deposit a plurality of layers of powder 38 simultaneously onto the operative surface 34 in a single pass.

As illustrated in the Figure, the layers of powder 38 are, preferably, deposited by the supply hoppers 36 in a staggered manner such that the formation of each individual layer is commenced slightly later that the individual layer of powder immediately beneath it. This ensures that a surface 40 of each layer of powder 38 will, at least in part, be exposed and not covered by an overlying layer of powder 38 during the simultaneous application of the layers.

An energy beam 42 is emitted from an energy source 44 and is directed onto the exposed surfaces 40 of each layer of powder 38 to melt or sinter the powder selectively, thereby forming part of the 3D object. This process is repeated for additional passes to add additional layers and incrementally build up the 3D object until it is completed.

Figure 3:
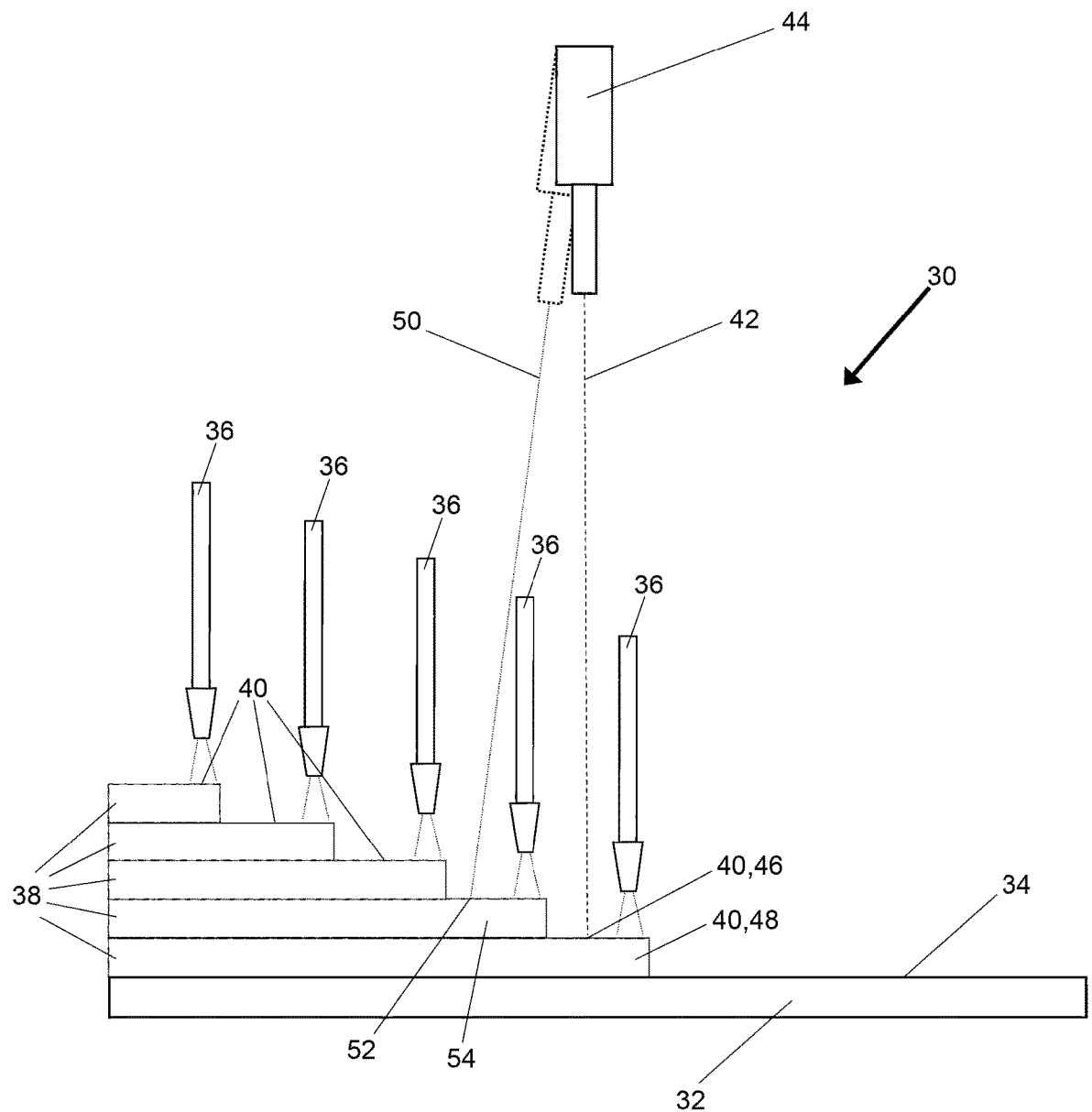
FIG. 3 is a further schematic representation of the 3D printing apparatus shown in FIG. 2.

As shown in FIG. 3, in the first embodiment of the invention the energy source 44 is adapted to operate as a raster such that while the layers of powder 38 are being simultaneously deposited by the supply hoppers 36, the orientation of the energy source 44 is adjusted such that the energy beam 42 is directed selectively onto each of the exposed surfaces 40 in a sequential manner.

For example, the energy beam 42 may initially be directed onto a first exposed surface 46 of a lowermost layer of powder 48. After the first exposed surface 46 has been sufficiently worked on by the energy beam 42, the orientation of the energy source 44 is then adjusted such that a second energy beam 50 is directed onto a second exposed surface 52 of a second layer of powder 54. This process is continued until all layers of powder deposited in the pass of the supply hoppers 36 have been worked on sufficiently before the next pass is conducted.

In the embodiment where the energy source 44 operates as a raster, the energy beam 42 may be applied to each exposed surface 40 of each powder layer 38, as necessary, for a sufficient period of time such that the powder is heated or energised causing it to melt or sinter before the energy source 44 is re-orientated for the next layer.

Alternatively, the energy beam 42 may be applied to each exposed surface 40 of powder 38 for a lesser period of time such that the powder is only partially heated or energised before the energy source 44 is re-orientated for the next layer. In this method, the energy source 44 is cycled repeatedly through the plurality of layers 38 in a rapid manner such that additional energy is applied to each exposed surface 40 on each iteration. This causing the temperature or energy of each surface 40 that is worked on to increase incrementally until it reaches a point at which the powder melts or sinters.

Figure 4:
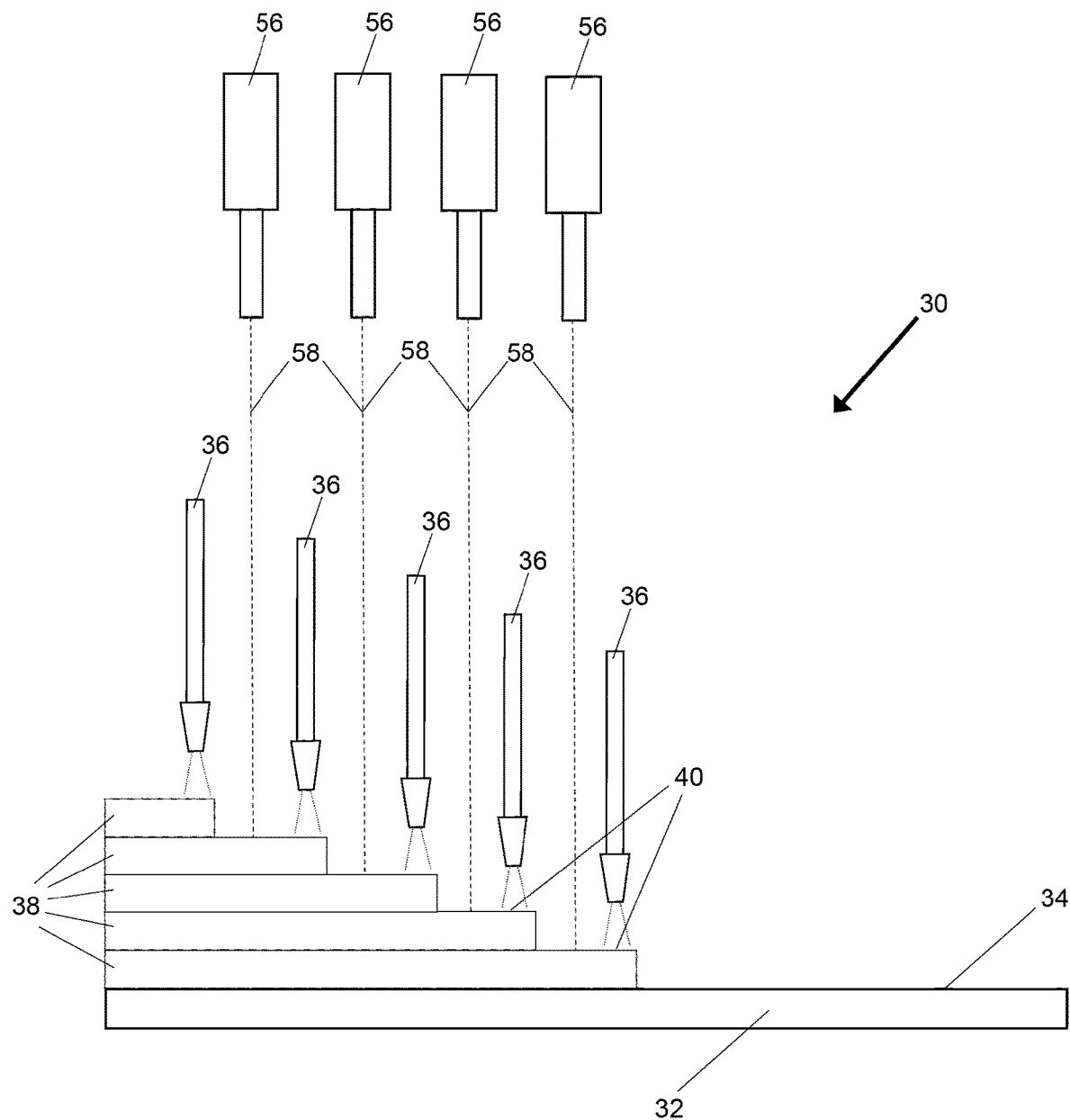
FIG. 4 is a schematic representation of a 3D printing apparatus according to a further embodiment of the invention.

Referring to FIG. 4, there is shown a further embodiment of the printing apparatus 30 according to the present invention. In this embodiment, the printing apparatus 30 comprises a plurality of energy sources 56. Whilst four energy sources 56 are used in the embodiment shown, it will be appreciated that an alternative number may be used.

The energy sources 56 are arranged in an array and, in contrast to the above-described raster approach, are adapted to emit a plurality of energy beams 58 simultaneously onto exposed surfaces 40 of the layers of powder 38.

Figure 5:
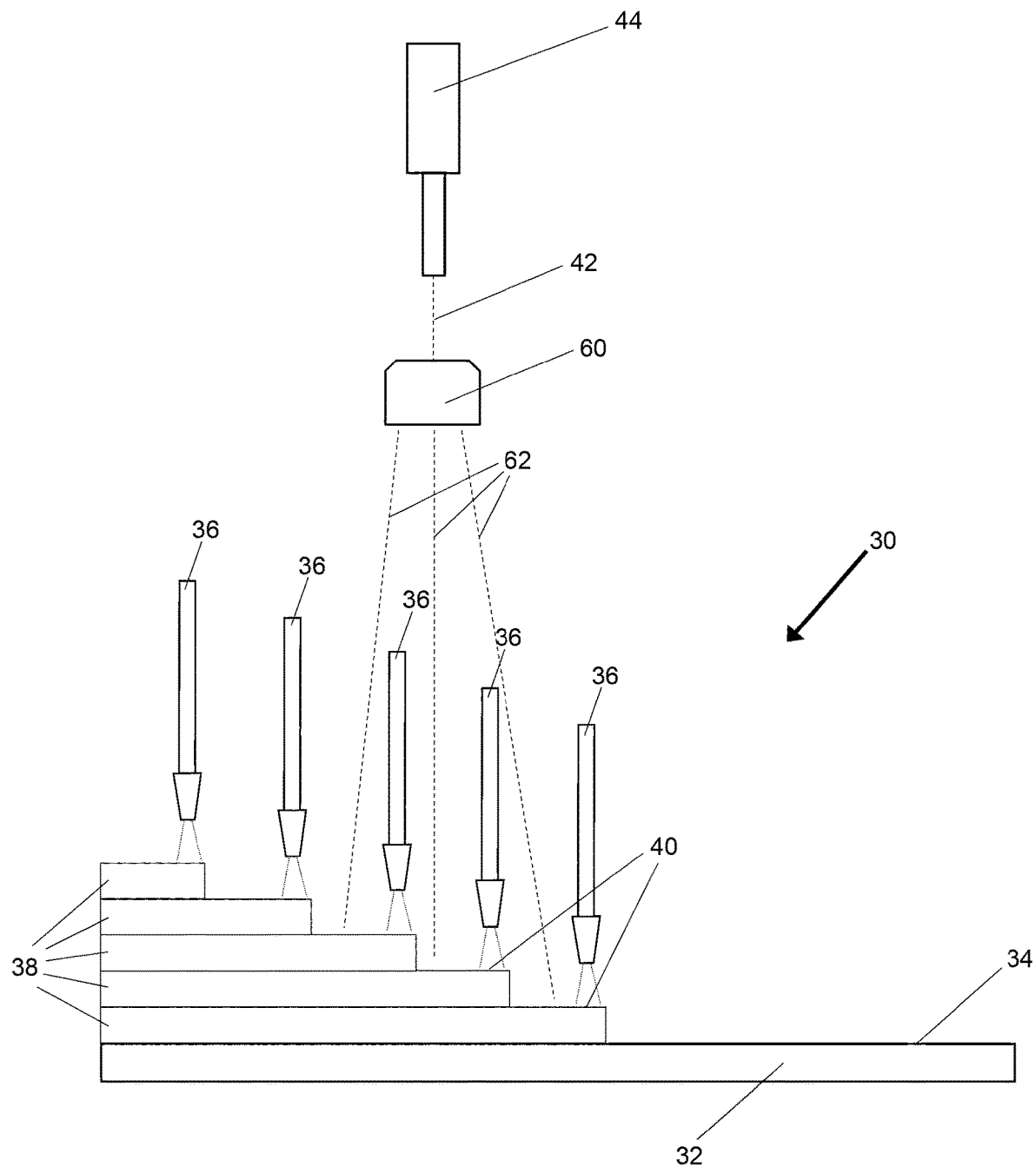
FIG. 5 is a schematic representation of a 3D printing apparatus according to a further embodiment of the invention.

Referring to FIG. 5, there is shown a further embodiment of the printing apparatus 30. In this embodiment, the printing apparatus 30 comprises a single energy source 44 adapted to emit a single energy beam 42 onto an energy beam splitting means 60.

The energy beam splitting means 60 splits the single energy beam 42 into a plurality of separate directed energy beams 62. The energy beam splitting means 60 operates in conjunction with a splitting control mechanism (not shown) which ensures that each directed energy beam 62 emitted from the energy beam splitting means 60 is directed, simultaneously, onto a different exposed surface 40 of a layer of powder 38.

In the embodiments shown in FIGS. 2 to 5, five supply hoppers 36 are used to deposit five layers of powder 38 onto the operative surface 34 simultaneously. This yields a five-fold increase in printing productivity levels compared to the conventional printing apparatus and methodology shown in FIG. 1.

It will be appreciated, however, that an alternative number of supply hoppers may be used in the present invention (for example, ten supply hoppers). More generally, N supply hoppers (where N≥2) may be used for simultaneously depositing N layers of powder, leading to an N-fold increase in printing productivity.

The energy source 44 or sources 56 used in the present invention can comprise any one of a laser beam, a collimated light beam, a micro-plasma welding arc, an electron beam, a particle beam or other suitable energy beam.

In embodiments of the invention that make use of electron beam energy sources, the printing apparatus 30 (including the operative surface 32) may be contained and operated wholly inside a vacuum chamber to facilitate propagation of the electron beam onto the layers of powder.

Alternatively, the energy source 44 may comprise a charged particle propagation apparatus that has been conceived by the applicant, which will obviate the need for housing the entire printing apparatus 30 inside a vacuum chamber.

Figure 6:
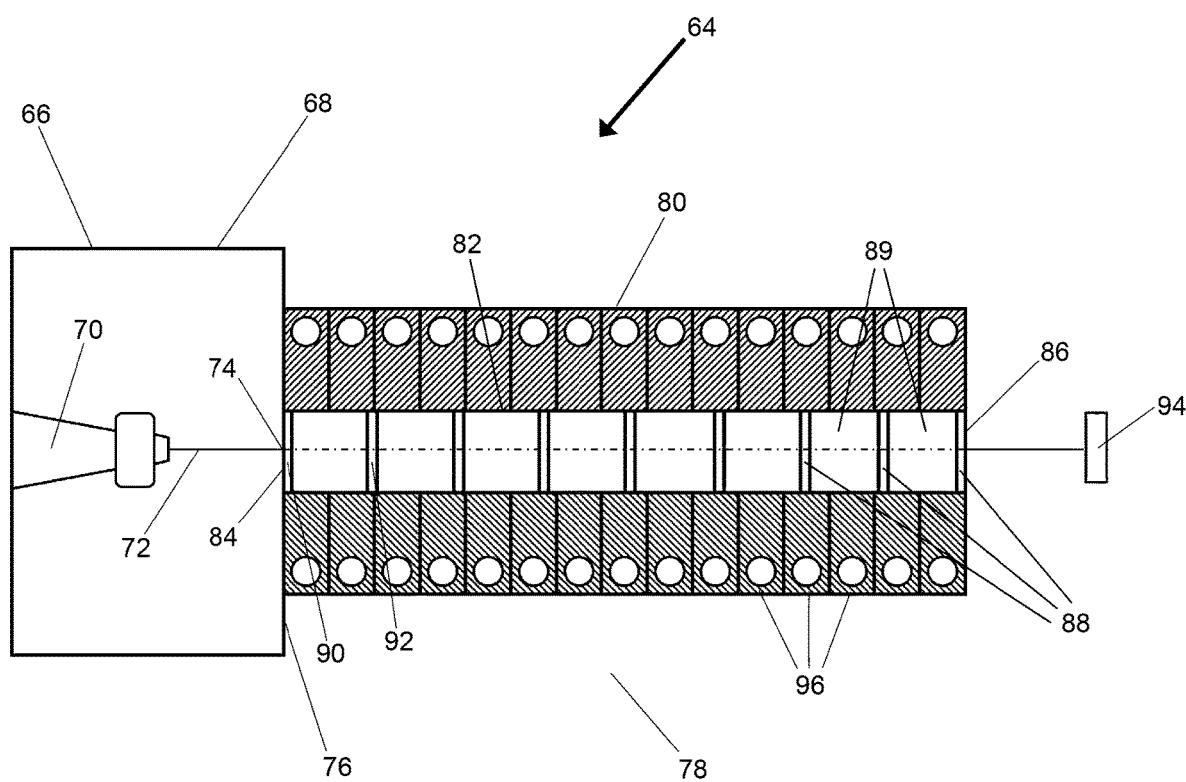
FIG. 6 is a schematic representation of a charged particle propagation apparatus according to a further aspect of the invention.

Referring to FIG. 6, there is shown a particle propagation apparatus 64 which forms a further aspect of the present invention.

The particle propagation apparatus 64 comprises a generator 66 comprising a vacuum chamber 68. Inside the vacuum chamber 68, there is disposed a gun 70 for discharging a charged particle beam 72. The gun 70 may, for example, comprise a high-powered 150 kW electron beam gun.

As shown in the Figure, the charged particle beam 72 is discharged from within the vacuum chamber 68 and out of the vacuum chamber 68 through a beam exit 74 disposed in a wall 76 of the vacuum chamber 68.

A region of higher pressure 78 adjoins the vacuum chamber 68 which is maintainable at a pressure greater than a pressure of the vacuum chamber 68. Preferably, the region of higher pressure 78 will be maintained at atmospheric pressure.

A plasma interface 80 is disposed at the beam exit 74 that comprises a plasma channel 82. Preferably, the plasma channel 82 is substantially aligned with the beam exit 74 such that the particle beam 72 may pass through an elongate length of the plasma channel 82.

The plasma channel 82 has a first end 84 and second end 86 and a plurality of electrode plates 88 are disposed between the first end 84 and the second end 86. Each electrode plate 88 has a central aperture (not shown) coaxially aligned with the plasma channel 82 which the particle beam 72 may pass there through.

Each electrode plate 88 is separated from the others in the plurality by an insulator 89 disposed between adjacent electrode plates 88. Each insulator 89 also has a central aperture (not shown) coaxially aligned with the plasma channel 82 which the particle beam 72 may also pass there through. Each insulator 89 is made from a material having electrical insulating properties such as, for example, aluminium oxide, high-density polyethylene, mica or polytetrafluoroethylene. The dimensions of each insulator 89 is adapted to minimise the distance between adjacent electrodes plates 88 while preventing electrical interference the electrodes plates 88.

In the exemplary embodiment shown in FIG. 6, the plasma channel 82 comprises nine electrode plates 88. However, it will be appreciated that an alternative number of plates may be used, provided always that a minimum of three plates is used.

In use, a plasma-forming gas, such as helium, argon or nitrogen, that is highly ionized and contains positive ions and electrons, is injected into the plasma channel 82 using an injection means known in the art such as, for example, a supply tube and mechanical gas pump (not shown).

Once the gas has sufficiently filled the plasma channel 82, electrical currents are applied to the electrode plates 88 causing a first plasma to form at the first end 84 of the plasma channel 82 and be maintained at a high pressure, which may be atmospheric pressure, for example. This may be achieved by supplying a high voltage, low current power supply to a first plate 90, thus causing the first plate 90 to form a cathode, followed by supplying a low voltage, high current power supply to a second plate 92, thus causing the second plate 92 to form an anode and thereby bounding a plasma between the first plate 90 and the second plate 92.

A pre-determined sequence of electrical currents are then applied selectively to the other electrode plates 88 in the channel 82 thereby causing the first plasma to move from the low pressure region at the first end 84 of the plasma channel 82 to the high pressure region at the second end 86 of the plasma channel 82.

After the first plasma has propagating through the plasma channel 82 towards its second end 86 by a sufficient length, further electrical currents may be applied to the first and second electrode plates 90,92 causing a second plasma to form at the first end 84 of the plasma channel 82. The second plasma is then, similarly, propagated through the plasma channel 82 towards its second end 86 by selectively applying a sequence currents to the other electrode plates 88.

This process may be repeated to cause further plasmas to be generated and travel simultaneously along the elongate length of the plasma channel 82 in succession. The movement of the, or each, plasma through the plasma channel 82 towards its second end 86 in this manner causes a substantial pumping down to occur at the beam exit 74. This process can be used to create the vacuum in the vacuum chamber 68 rapidly and maintain the same once formed.

Further, the sequence of currents applied to the electrode plates 88 may be adapted such that a non-plasma region is formed between two plasmas that are traveling simultaneously along the elongate length of the plasma channel 82.

In embodiments of the plasma channel 82 comprising a high number of electrode plates 88, a high number of plasmas and corresponding non-plasma regions may travel simultaneously along the elongate length of the plasma channel 82.

The, or each, non-plasma region may contain residual gas from the vacuum chamber. This substantially increases the power and effectiveness of the pumping down that is performed at the beam exit 74.

The particle beam 72 propagates from the vacuum chamber 68, through the beam exit 74 and through the, or each, plasma that may be present in the plasma channel 82, without dispersion or attenuation, and onto a workpiece 94 disposed in the region of higher pressure 78. This arrangement provides for substantially unhindered transmission of charged particles from the gun 70 to the workpiece 94.

Each plasma that is formed within, and propagating through, the plasma channel 82 may reach a high temperature of approximately 15,000° K. Stabilizing means are used to stabilize each plasma preferably by providing a lower temperature boundary around each plasma. The stabilizing means may comprise a plurality of coaxially stacked together annular cooling plates 96 with the plates 96 collectively having a central bore which defines the plasma channel 82 therethrough.

Cooling fluid or gas is circulated under pressure through each of the cooling plates 96 for removing heat therefrom for stablishing a lower temperature boundary around each plasma. During operation, heat is transmitted radially outwardly by conduction through the cooling plates 96 and is removed by the cooling fluid circulating therethrough. Accordingly, by circulating the cooling fluid or gas around the plasma channel 82, heat is removed therefrom for stabilising each plasma.

Figure 7:
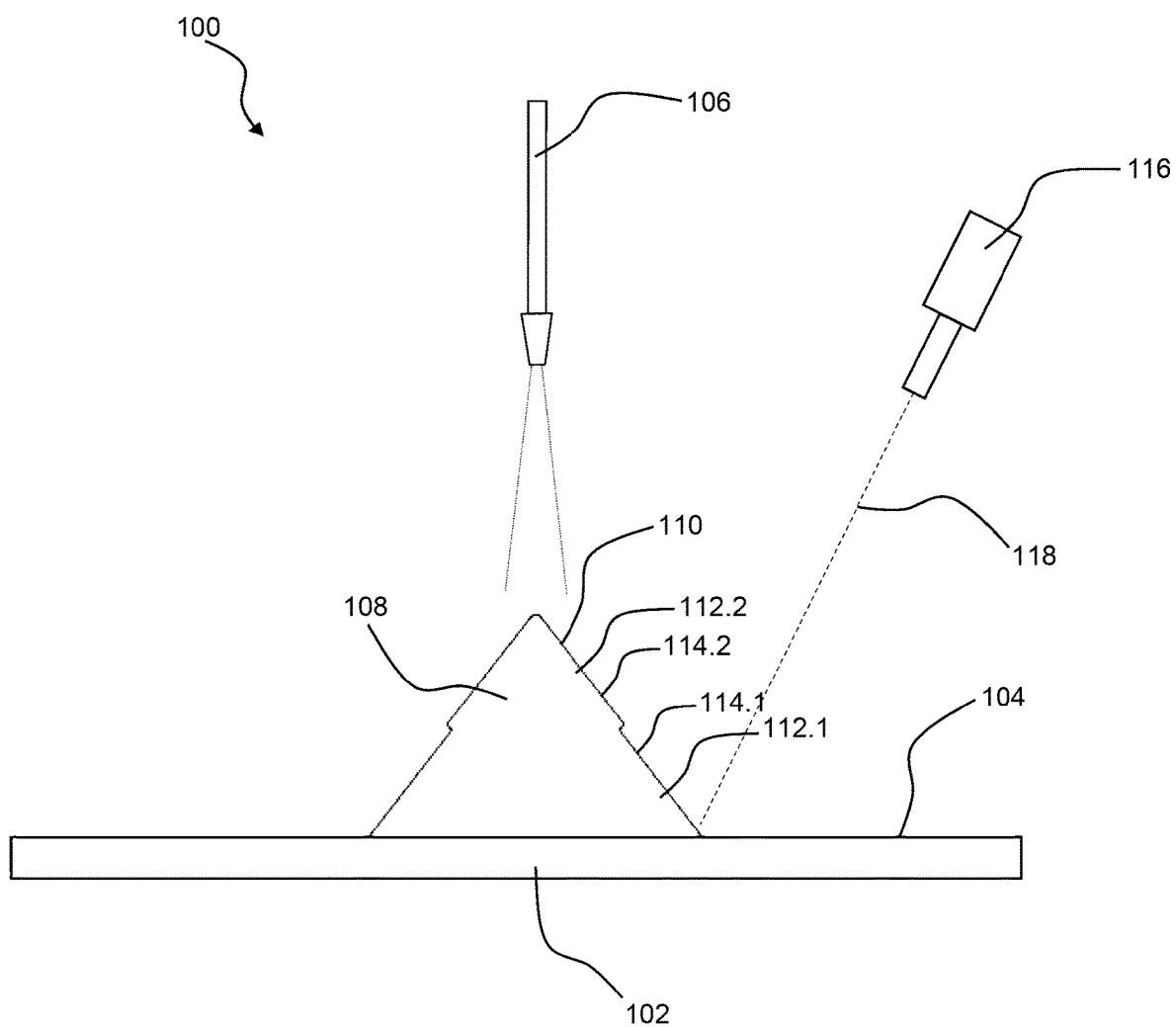
FIG. 7 is a schematic representation of a 3D printing apparatus according to a further embodiment of the invention.
Figure 8:
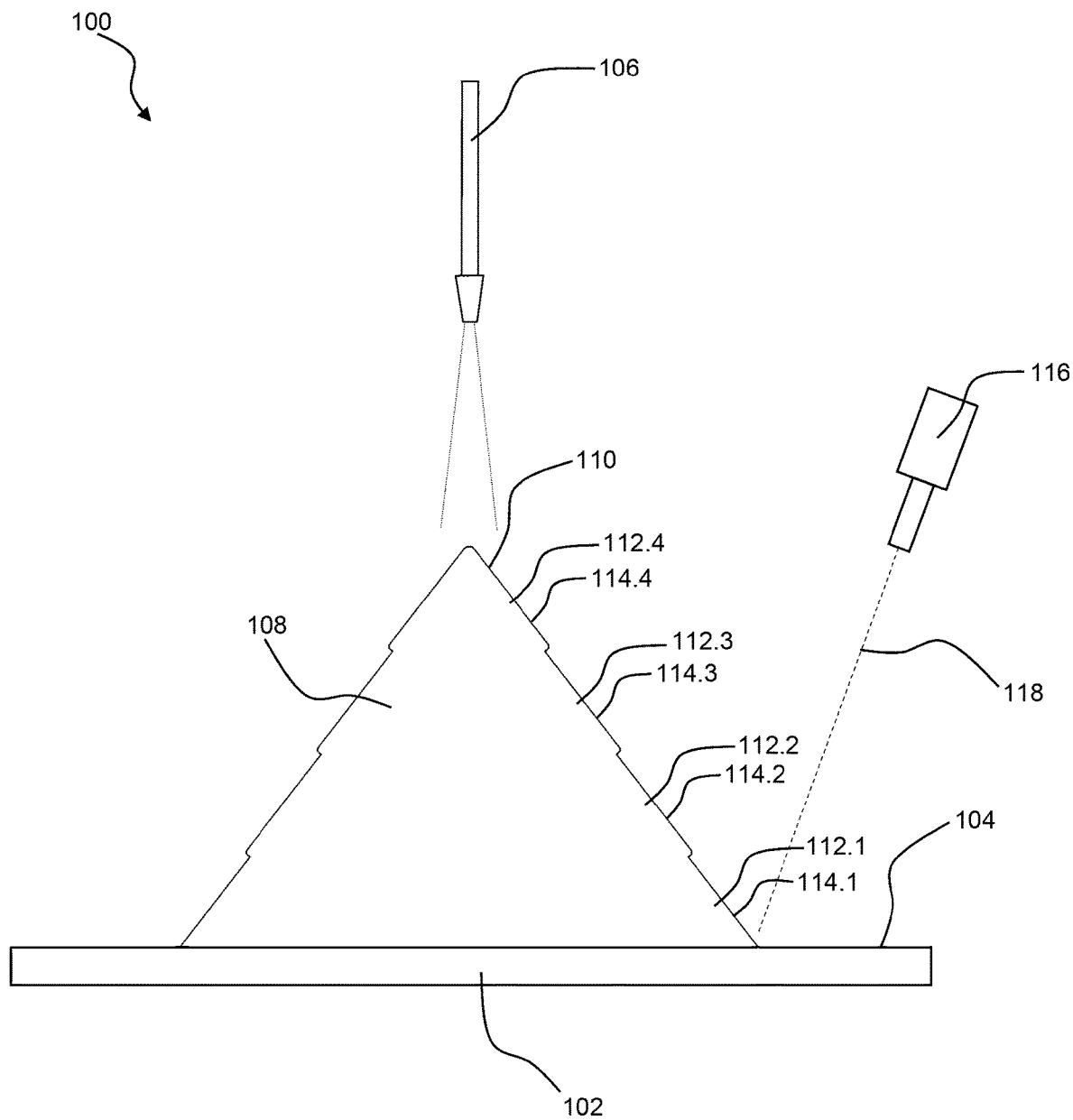
FIG. 8 is a further schematic representation of the 3D printing apparatus shown in FIG. 7.
Figure 9:
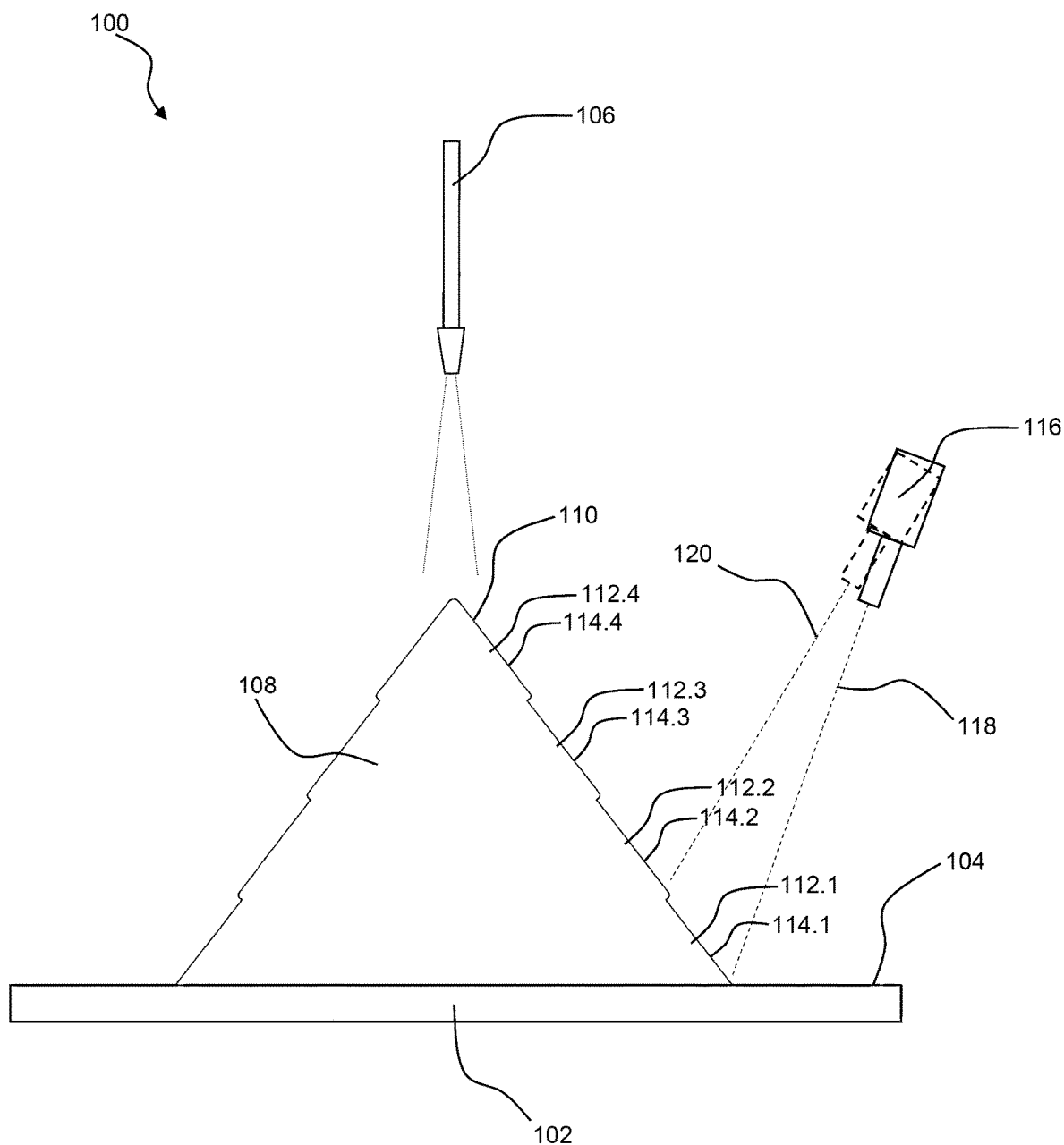
FIG. 9 is a further schematic representation of the 3D printing apparatus shown in FIG. 7.

Referring now to FIGS. 7 to 9, there is shown a schematic representation of a 3D printing method and apparatus 100 according to a further embodiment of the present invention. The apparatus 100 comprises a substrate 102 having an operative surface 104 on which a printed object is to be fabricated by 3D printing.

The apparatus 100 further comprises a single supply hopper 106. The supply hopper 106 is adapted such that it dispenses powder onto a heap 108 on the operative surface 104.

As shown in FIG. 7, in use the heap 108 is, initially, small and contains a corresponding small volume of powder. As additional powder is dispensed from the supply hopper 106, the size of the heap 108, and the corresponding volume of powder that the heap 108 contains, increases in a commensurate manner, as is illustrated by FIG. 8.

Like the embodiments illustrated in FIGS. 2 to 5, in this embodiment of the invention the supply hopper 106 is also configured to deposit multiple layers of powder onto the operative surface simultaneously. To achieve this, as the powder is progressively dispensed from the supply hopper 106 onto the heap 108, the powder flows down an external surface 110 of the heap 108 in a staggered manner such that a plurality of cascading layers of powder 112 form and flow simultaneously over the external surface 110.

In FIG. 7, the heap 108 is shown with two layers of powder (112.1, 112.2) that have formed and are flowing simultaneously along the external surface 110. In FIG. 8, the heap 108 is shown with four layers of cascading powder (112.1, 112.2, 112.3 and 112.4) that have formed and are flowing simultaneously on the external surface 112. It will be appreciated, however, that at any point in time during use of the apparatus 100, an alternative number of cascading powder layers 112 may be layered and be flowing simultaneously along the external surface 110 of the heap 108.

The cascading layers of powder 112 are formed as a result of one or more means operating in isolation or unison. For example, the apparatus 100, preferably, comprises a flow control mechanism that causes powder to be released from the supply hopper 106 in a staggered manner thereby causing the powder to form into the cascading layers 112 as it flows simultaneously down the external surface 110.

Alternatively, the powder is formed into the cascading layers 112 as a result of one or more physical properties of the particles comprising the powder such as, for example, the surface roughness, adhesion and/or friability of the particles.

Dispensing the powder in cascading layers 112 provides that at any point in time during operation of the apparatus 100, each individual layer of powder 112 on the heap 108 has an external surface 114 that is, at least in part, not covered by an adjacent layer of powder. Referring to FIG. 8, for example, whilst the first layer of powder 112.1 shown in the Figure is substantially covered by the second 112.2, third 112.3 and fourth 112.4 layers of powder, at least part of its external surface 114.1 remains uncovered.

The apparatus 100 further comprises an energy source 116. An energy beam 118 is emitted from the energy source 116 and is directed onto the exposed surfaces 114 of each layer of powder 112 on the heap 108 to melt or sinter the powder selectively, thereby forming part of the 3D object.

The energy beam 118 is applied to the heap 108 progressively as the heap 108 increases in size in order to incrementally build up the 3D object until it is completed.

As shown in FIG. 9, the energy source 116 may be adapted to operate as a raster such that while the layers of powder 112 simultaneously flow down the surface 110 in a cascading manner, the orientation of the energy source 116 is adjusted such that the energy beam 118 is directed selectively onto each of the exposed surfaces 114 in a sequential manner.

For example, the energy beam 118 may initially be directed onto a first exposed surface 114.1 of the first layer of powder 112.1. After the first exposed surface 114.1 has been sufficiently worked on by the energy beam 118, the orientation of the energy source 116 is then adjusted such that a second energy beam 120 is directed onto a second exposed surface 114.2 of a second layer of powder 112.2. This process is repeated for the third and fourth powder layers 112.3, 112.4.

In embodiments where the energy source 116 operates as a raster, the energy beam 118 may be applied to each exposed surface 114 of each powder layer 112, as necessary, for a sufficient period of time such that the powder is heated or energised causing it to melt or sinter before the energy source 116 is re-orientated for the next layer 112.

Alternatively, the energy beam 118 may be applied to each exposed surface 114 of powder for a lesser period of time such that the powder is only partially heated or energised before the energy source 116 is re-orientated for the next layer 112. In this embodiment, the energy source 116 will be cycled repeatedly through the plurality of layers 114 in a rapid manner such that additional energy is applied to each exposed surface on each iteration. This causing the temperature or energy of each surface that is worked on to increase incrementally until it reaches a point at which the powder melts or sinters.

The apparatus 100, preferably, also comprises a scanning means (not shown) adapted to determine a position, velocity and/or size of one, or more particles comprised in the powder 108 when the, or each, particle is travelling from the supply hopper 106 to the heap 108.

The scanning means is, preferably, also adapted to measure the airborne density of the powder.

The scanning means is, preferably, also adapted to measure a volume of powder deposited on the heap 108.

The scanning means is, preferably, also adapted to measure a level or profile of the powder deposited on heap 108.

The scanning means may make use of an ultra-sonic, laser or other appropriate known scanning or positioning technology.

Information and data collected using the scanning means is used, in conjunction with control electronics and software, to determine the volumetric flow rate, direction and/or velocity of powder emitted from the supply hopper 106 and/or the direction and intensity of the energy beam 118 to optimise fabrication of the part being printed.

The energy source 116 can be any one of a laser beam, a collimated light beam, a micro-plasma welding arc, an electron beam, a particle beam or other suitable energy beam.

In embodiments of the invention that make use of electron beam energy sources, the printing apparatus 100 (including the operative surface 104) may be contained and operated wholly inside a vacuum chamber to facilitate propagation of the electron beam onto the layers of powder.

Alternatively, the energy source 116 may comprise the charged particle propagation apparatus described above, which will obviate the need for housing the entire printing apparatus 100 inside a vacuum chamber.

Dispensing multiple powder layers 114 onto the operative surface 104 simultaneously, and operating on the layers, in this manner substantially increases in printing productivity levels compared to the conventional printing apparatus and methodology shown in FIG. 1.

Figure 10:
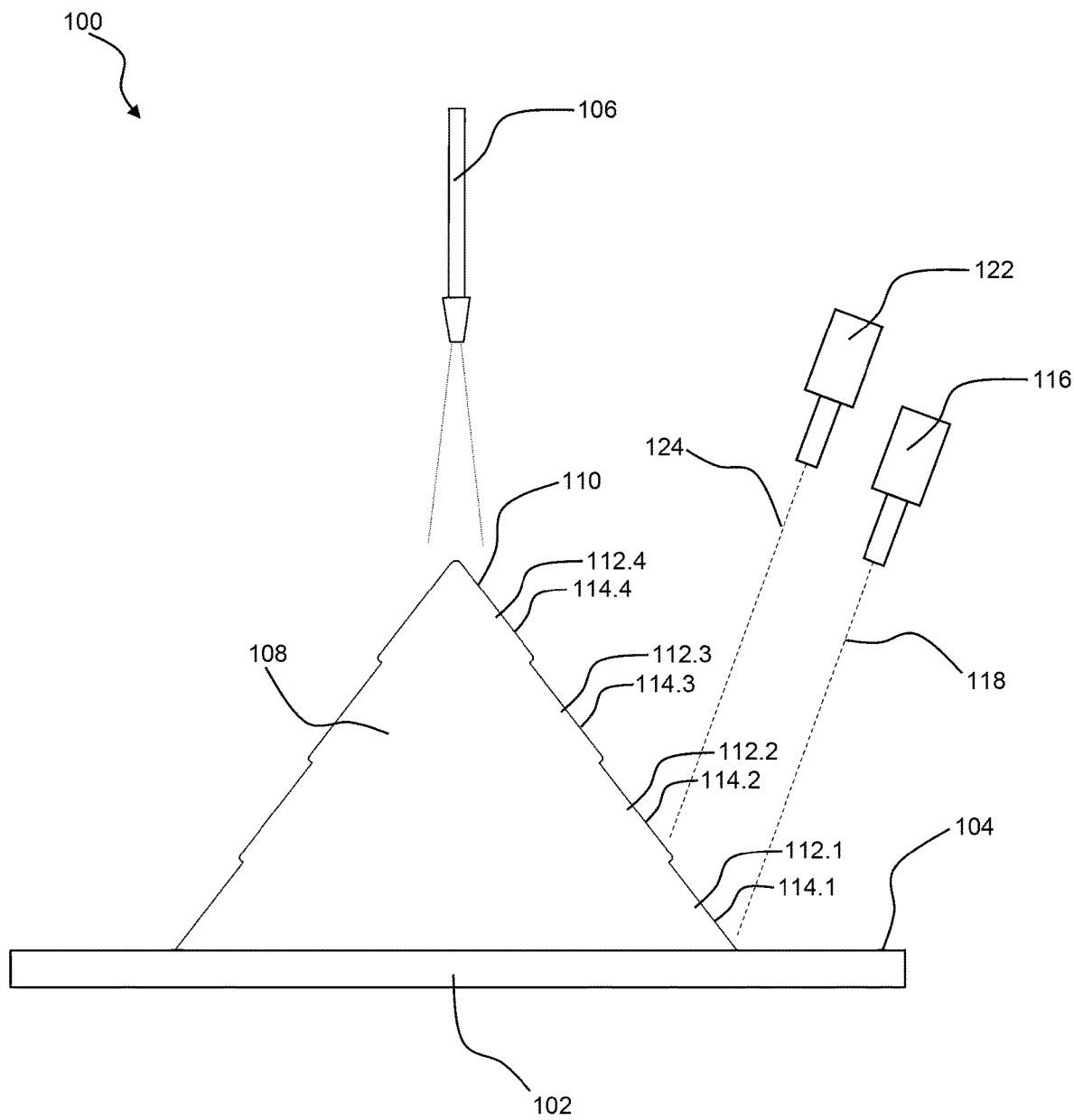
FIG. 10 is a schematic representation of a 3D printing apparatus according to a further embodiment of the invention.

Referring to FIG. 10, there is shown a further embodiment of the present invention. This disclosed embodiment is identical in all material respects to the embodiment illustrated in FIGS. 7 to 9 save that the printing apparatus 100 comprises multiple energy sources and, in particular, a first 116 and a second 122 energy source. The energy sources 116, 122 are adapted to emit two energy beams 118, 124 simultaneously onto exposed surfaces 114.1, 114.2 of the first and second layers of powder 112.1, 112.2. The energy sources 116, 122 work on the cascading powder layers 114 comprised in the heap 108 two at a time simultaneously.

Whilst two energy sources 116, 122, and two corresponding energy beams 118, 124, are used in this embodiment, it will be appreciated that N number of energy sources and energy beams may be used to simultaneously work on N layers of powder 114 in the heap 108 simultaneously.

Figure 11:
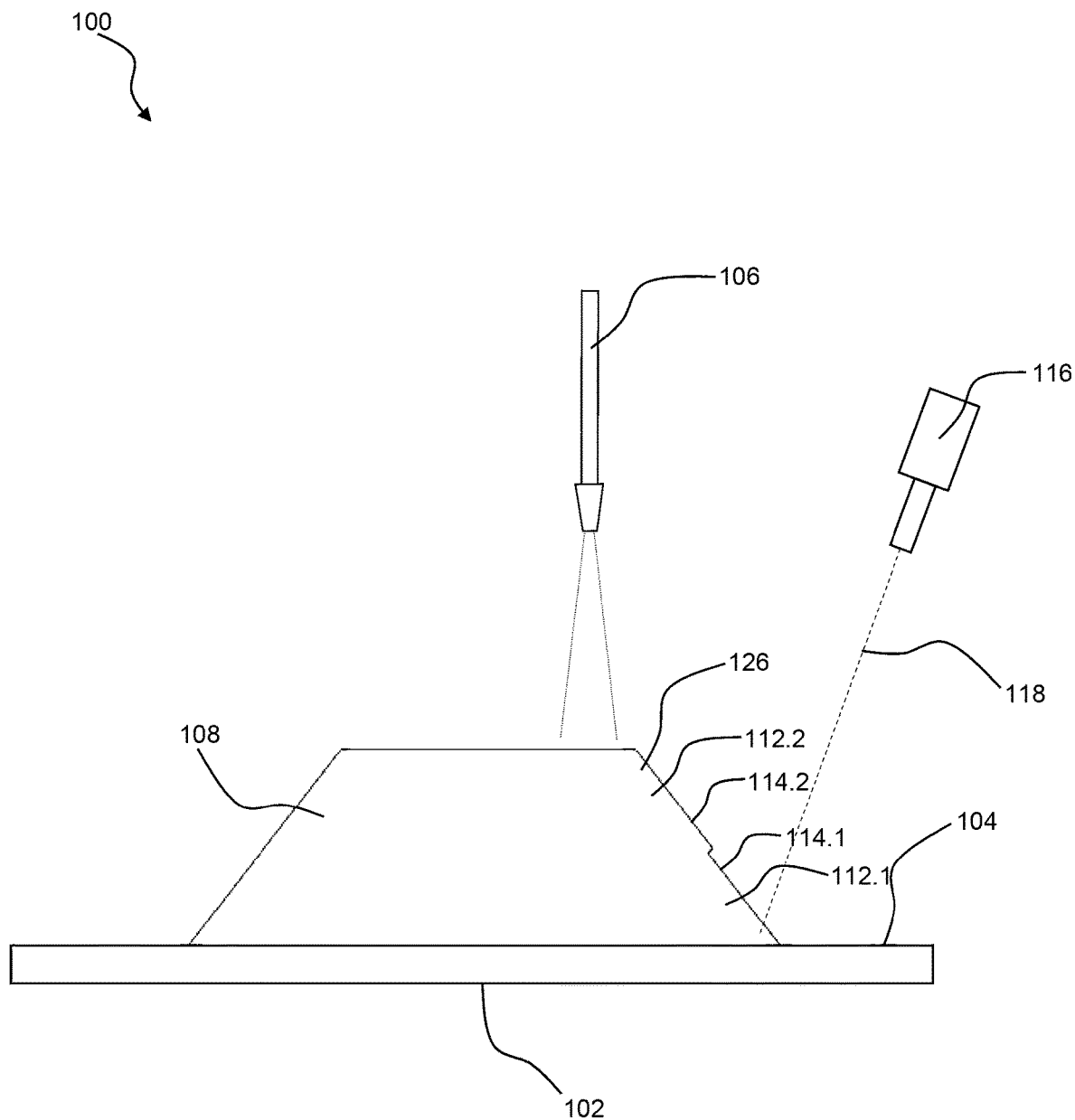
FIG. 11 is a schematic representation of a 3D printing apparatus according to a further embodiment of the invention.

Referring to FIG. 11, there is shown a further embodiment of the present invention. The disclosed embodiment is also identical in all material respects to the embodiment illustrated in FIGS. 7 to 9 save that the supply hopper 106 is configured to deposit powder substantially onto individual sides, or individual parts, of the powder heap 108 in sequence or succession.

For example, in the Figure the supply hopper 106 is shown depositing powder onto a far right side 126 of the powder heap 108 thereby forming first and second cascading layers of powder 112.1 and 112.2 at the right side 126. The energy source 116 is configured to direct its energy beam 118 onto respective exposed surfaces 114.1, 114.2 of the two powder layers 112.1 and 112.2 to melt or sinter the powder selectively to fabricate part of the 3D object at the right side 126.

The supply hopper 106 and energy beam 118 will then, subsequently, be directed onto further individual sides or parts of the power heap 108 in order to form further cascading layers and parts of the 3D object at the sides or parts until the 3D object has been formed completely.

The scanning means described above is used to measure, in real-time, the shape, form, surface characteristics and/or relative positions of the individual powder layers 112.1, 112.2 being formed on sides of the heap 108. This information is used by the apparatus 100, in conjunction with control electronics and software, to determine and continuously control the direction and power of the energy beam 118, and the corresponding position of resultant weld pools, such that individual layers 112.1, 112.2 formed are melted, sintered and/or fused correctly in order to fabricate the 3D object.

Figure 12A:
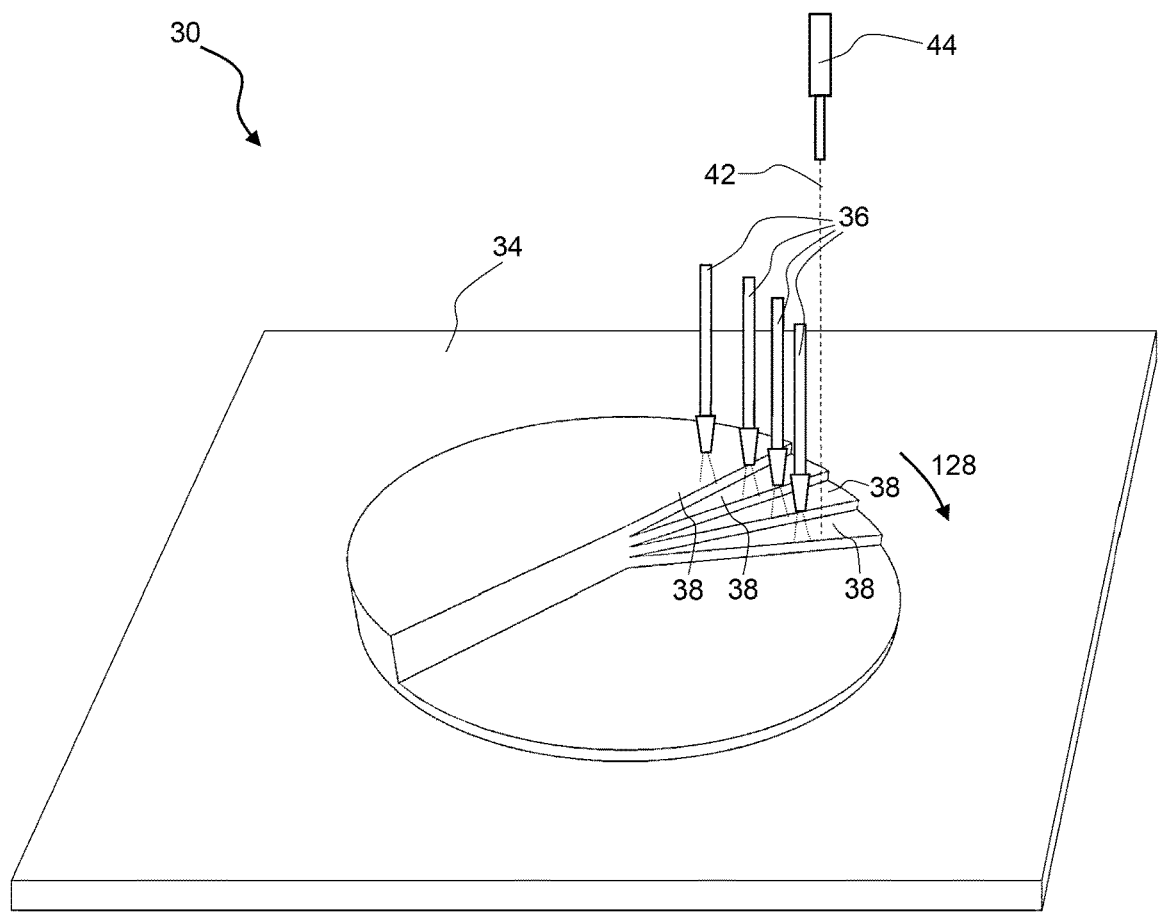
FIG. 12(a) is a perspective view of a 3D printing apparatus according to a further embodiment of the invention.
Figure 12B:
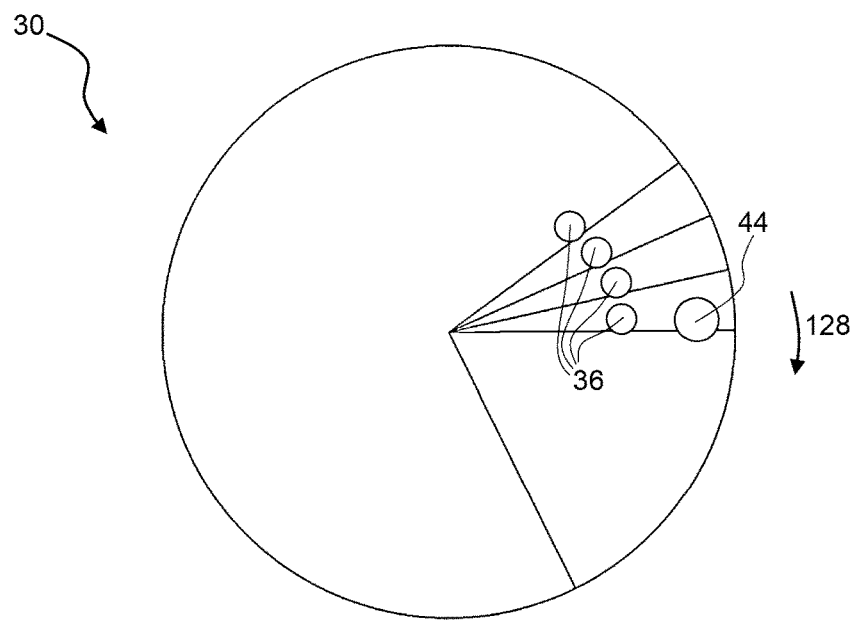
FIG. 12(b) is a top view of the 3D printing apparatus shown in FIG. 12(a).

Referring to FIGS. 12(*a*) and 12(*b*), there is shown a further embodiment of the printing apparatus 30 according to the present invention. In this embodiment, the supply hoppers 36 and control mechanism of the printing apparatus 30 are configured to deposit layers of powder 38 simultaneously onto the operative surface 34 in a curved path. This provides that the embodiment is particularly adapted to fabricate 3D objects having a generally circular or curved form.

Preferably, the multiple layers of powder 38 are deposited in a stepwise or helical manner. This provides that when the supply hoppers 36 have finished a complete rotation and the batch of layers 38 deposited have been worked on by the energy source 44 sufficiently to form a first layer of the 3D object, then the supply hoppers 36 will subsequently deposit the next batch of multiple layers immediately above the previous batch to form the next layer of the object incrementally.

The embodiment depicted in the Figures has four supply hoppers 36 that are configured to deposit four layers of powder 38 simultaneously in a curved path along the rotational direction indicated by reference numeral 128. This advantageously yields a four-fold increase in printing productivity for 3D objects having a circular or curved form compared to prior art printing apparatuses and methods. It will be appreciated that, more generally, N supply hoppers (where N≥2) may be used for simultaneously depositing N layers of powder in a curved path, leading to an N-fold increase in printing productivity for circular or curved objects.

Modifications and variations as would be apparent to a skilled addressee are deemed to be within the scope of the present invention.

In the claims that follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

The invention claimed is:

1. A printing apparatus for printing a three-dimensional object, comprising:
   an operative surface;
   an energy source for emitting at least one energy beam onto the operative surface; and
   a powder dispensing mechanism comprising a plurality of supply hoppers and a supply controller, the plurality of supply hoppers and the supply controller being configured to dispense powder adapted to be melted by the energy source from each of the plurality of supply hoppers onto the operative surface to form a plurality of layers of powder of the single three-dimensional object simultaneously;

wherein in use the plurality of supply hoppers are configured to move relative to the operative surface while dispensing the powder;

wherein each layer in the plurality of layers of powder is dispensed onto a subjacent layer in the plurality of layers of powder or, for a bottommost layer in the plurality of layers of powder, the operative surface;

wherein the plurality of layers of powder are formed in a staggered manner such that, when being worked on by the at least one energy beam, each layer in the plurality of layers of powder has an exposed topmost surface section that is not covered by an overlying layer of powder;

wherein the energy source is configured to emit the at least one energy beam onto each of the exposed topmost surface sections simultaneously or sequentially; and wherein the energy source is configured to be re-oriented to direct the at least one energy beam onto different layers among the plurality of layers.

2. The printing apparatus according to claim 1, wherein the printing apparatus further comprises an energy beam splitter configured for splitting and directing an energy beam into two or more separate energy beams.

3. The printing apparatus according to claim 1, wherein the plurality of supply hoppers and the supply controller are configured to deposit the plurality of layers of powder onto the operative surface in a curved path.

4. The printing apparatus according to claim 1, wherein the powder dispensing mechanism dispenses powder onto a heap on the operative surface in a manner such that the plurality of layers of powder are a plurality of cascading layers of powder that flow simultaneously over an external surface of the heap, each layer in the plurality of cascading layers of powder having an exposed surface that is, at least in part, not covered by a superjacent layer in the plurality of cascading layers of powder while the layer is being formed.

5. The printing apparatus according to claim 4, wherein the energy source emits energy beams onto two or more layers in the plurality of cascading layers of powder on the heap simultaneously.

6. The printing apparatus according to claim 4, wherein the energy source emits energy beams onto individual layers in the plurality of cascading layers of powder on the heap in a sequence.

7. The printing apparatus according to claim 4, wherein the printing apparatus further comprises a scanner for determining a position, velocity and/or size of one or more particles comprised in the powder when the, or each, particle is travelling from one or each of the supply hoppers to the heap.

8. The printing apparatus according to claim 7, wherein the scanner is adapted to measure an airborne density of the powder travelling to the heap.

9. The printing apparatus according to claim 7, wherein the scanner is adapted to measure a volume of powder deposited on the heap.

10. The printing apparatus according to claim 7, wherein the scanner is adapted to measure a shape or profile of the heap.

11. The printing apparatus according to claim 7, wherein the scanner is adapted to measure a shape, form, relative position or one or more surface characteristics of the plurality of cascading layers of powder formed on the external surface of the heap.

12. The printing apparatus according to claim 1, wherein the energy source is configured to emit a laser beam.

13. The printing apparatus according to claim 1, wherein the energy source is configured to emit a collimated light beam.

14. The printing apparatus according to claim 1, wherein the energy source is configured to emit a micro-plasma welding arc.

15. The printing apparatus according to claim 1, wherein the energy source is configured to emit an electron beam.

16. A printing apparatus for printing a three-dimensional object, comprising:
an operative surface;
an energy source for emitting at least one energy beam onto the operative surface; and
a powder dispensing mechanism comprising a plurality of supply hoppers and a supply controller, the plurality of supply hoppers and the supply controller being configured to dispense powder in a curved path, wherein in use the plurality of supply hoppers are configured to move relative to the operative surface while dispensing the powder, and wherein the powder is adapted to be melted by the energy source from each of the plurality of supply hoppers onto the operative surface to form a plurality of layers of powder of the single three-dimensional object simultaneously;
wherein each layer in the plurality of layers of powder is dispensed onto a subjacent layer in the plurality of layers of powder or, for a bottommost layer in the plurality of layers of powder, the operative surface;
wherein the plurality of layers of powder are formed in a staggered manner such that, when being worked on by the at least one energy beam, each layer in the plurality of layers of powder has an exposed topmost surface section that is not covered by an overlying layer of powder;
wherein the energy source is configured to emit the at least one energy beam onto each of the exposed topmost surface sections simultaneously or sequentially; and
wherein the energy source is configured to be re-oriented to direct the at least one energy beam onto different layers among the plurality of layers.

17. A method for printing a three-dimensional object using a printing apparatus, the printing apparatus comprising an operative surface, an energy source configured to emit at least one energy beam, and a powder dispensing mechanism comprising a plurality of supply hoppers and a supply controller, the method comprising the steps of:
depositing a plurality of layers of powder of the single three-dimensional object simultaneously onto the operative surface using the plurality of supply hoppers and the supply controller such that each layer in the plurality of layers of powder is dispensed onto a subjacent layer in the plurality of layers of powder or, for a bottommost layer in the plurality of layers of powder, the operative surface, wherein in use the plurality of supply hoppers are configured to move relative to the operative surface while dispensing the powder, and wherein the plurality of layers of powder are formed in a staggered manner such that, when being worked on by the at least one energy beam, each layer in the plurality of layers of powder has an exposed topmost surface section that is not covered by an overlying layer of powder;

using the energy source to emit the at least one energy beam onto each of the exposed topmost surface sections simultaneously or sequentially to melt one or more of the plurality of layers of powder and form part of the single three-dimensional object, wherein the energy source is re-oriented to direct the at least one energy beam onto different layers among the plurality of layers; and repeating the steps above until the single three-dimensional object is completely formed.

18. A method for printing a three-dimensional object, the method comprising the step of:

(a) providing a printing apparatus for printing the single three-dimensional object, the printing apparatus comprising an operative surface, an energy source for emitting at least one energy beam onto the operative surface, and a powder dispensing mechanism comprising a plurality of supply hoppers and a supply controller, the plurality of supply hoppers and the supply controller being configured for depositing a plurality of layers of powder adapted to be melted by the energy source from each of the plurality of supply hoppers onto the operative surface to form a plurality of layers of powder of the single three-dimensional object simultaneously, wherein each layer in the plurality of layers of powder is dispensed onto a subjacent layer in the plurality of layers of powder or, for a bottommost layer in the plurality of layers of powder, the operative surface, wherein in use the plurality of supply hoppers are configured to move relative to the operative surface while dispensing the powder, and wherein the plurality of layers of powder are formed in a staggered manner such that, when being worked on by the at least one energy beam, each layer in the plurality of layers of powder has an exposed topmost surface section that is not covered by an overlying layer of powder; and wherein the energy source is configured to emit the at least one energy beam onto each of the exposed surface sections simultaneously or sequentially;

wherein the method further comprises the steps of:

(b) depositing the plurality of layers of powder simultaneously onto the operative surface such that each layer in the plurality of layers of powder is dispensed onto a subjacent layer in the plurality of layers of powder or, for the bottommost layer in the plurality of layers of powder, the operative surface;

(c) forming the plurality of layers of powder in the staggered manner such that, when being worked on by the at least one energy beam, each layer in the plurality of layers of powder has the exposed topmost surface section that is not covered by the overlying layer of powder;

(d) using the energy source to emit the at least one energy beam onto each of the exposed topmost surface sections simultaneously or sequentially to melt the powder and form part of the single three-dimensional object, wherein the energy source is re-oriented to direct the at least one energy beam onto different layers among the plurality of layers; and (e) repeating steps (b)-(d) until the single three-dimensional object is completely formed.

\* \* \* \* \*